US012643523B2

(12) United States Patent
Chelaidite

(10) Patent No.: US 12,643,523 B2
(45) Date of Patent: Jun. 2, 2026

(54) LOAD SENSING DEVICE FOR ELECTRIC BRAKE

(71) Applicant: ZF Active Safety US Inc., Livonia, MI (US)

(72) Inventor: Galus Chelaidite, South Lyon, MI (US)

(73) Assignee: ZF ACTIVE SAFETY US INC., Livonia, MI (US)

( * ) Notice: Subject to any disclaimer, the term of this patent is extended or adjusted under 35 U.S.C. 154(b) by 436 days.

(21) Appl. No.: 18/322,630

(22) Filed: May 24, 2023

(65) Prior Publication Data

US 2024/0391442 A1 Nov. 28, 2024

(51) Int. Cl.
| | |
|---|---|
| B60T 13/74 | (2006.01) |
| B60T 17/22 | (2006.01) |
| F16D 65/18 | (2006.01) |
| F16D 66/00 | (2006.01) |
| F16D 121/24 | (2012.01) |
| F16D 125/40 | (2012.01) |
| F16D 125/50 | (2012.01) |

(52) U.S. Cl.
CPC ............ B60T 13/746 (2013.01); B60T 17/22 (2013.01); F16D 65/18 (2013.01); F16D 66/00 (2013.01); F16D 2066/005 (2013.01); F16D 2121/24 (2013.01); F16D 2125/40 (2013.01); F16D 2125/50 (2013.01)

(58) Field of Classification Search
CPC ...... B60T 13/746; B60T 13/741; B60T 17/22; F16D 65/18; F16D 66/00; F16D 2066/005; F16D 2121/24; F16D 2125/40; F16D 2125/50; F16D 55/226

See application file for complete search history.

(56) References Cited

U.S. PATENT DOCUMENTS

| | | | |
|---|---|---|---|
| 9,976,614 B2 | 5/2018 | Gerber et al. | |
| 10,808,781 B2 | 10/2020 | Yamasaki | |
| 10,906,517 B2 | 2/2021 | Hofschulte et al. | |
| 2009/0152071 A1* | 6/2009 | Jeon ...................... B60T 13/746 | |
| | | | 192/222 |
| 2017/0066428 A1* | 3/2017 | Masuda .................. H02P 15/00 | |
| 2019/0331180 A1 | 10/2019 | Chelaidite | |
| 2020/0278000 A1* | 9/2020 | Hagiwara ............... B60T 13/74 | |

FOREIGN PATENT DOCUMENTS

| | | | |
|---|---|---|---|
| DE | 102011017192 A1 * | 10/2012 | ............... F16D 3/56 |
| DE | 102021108260 A1 | 9/2021 | |
| DE | 102024202126 A1 | 10/2024 | |

* cited by examiner

*Primary Examiner* — David R Morris

(74) *Attorney, Agent, or Firm* — Tarolli, Sundheim, Covell & Tummino LLP

(57) ABSTRACT

An actuator for an electric brake of a vehicle having a caliper assembly driven by a motor includes a gear train for transferring torque from the motor to the caliper assembly to brake the vehicle. The gear train has an input gear and a sun gear connected to one another. A load sensing device senses relative rotation between the sun gear and the input gear in response to rotation of the motor during a braking operation. A controller is connected to the load sensing device and configured to adjust the torque applied to the gear train in response to receiving signals from the load sensing device indicative of the relative rotation.

17 Claims, 9 Drawing Sheets

LOAD SENSING DEVICE FOR ELECTRIC BRAKE

TECHNICAL FIELD

The present invention relates to braking systems and, in particular, relates to an electric brake having a load sensing device.

BACKGROUND

Current vehicles are equipped with electric motor service brakes for helping control vehicle braking depending on predetermined scenarios. The service brakes rely on one or more movable pistons that selectively apply force to brake pads in order to slow down or stop rotating wheel rotors on the vehicle. The electric motor direction of rotation can be reversed to release or reduce braking in emergency scenarios or drive-away conditions from a standstill on a hill.

SUMMARY

In one example, an actuator for an electric brake of a vehicle having a caliper assembly driven by a motor includes a gear train for transferring torque from the motor to the caliper assembly to brake the vehicle. The gear train has an input gear and a sun gear connected to one another. A load sensing device senses relative rotation between the sun gear and the input gear in response to rotation of the motor during a braking operation. A controller is connected to the load sensing device and configured to adjust the torque applied to the gear train in response to receiving signals from the load sensing device indicative of the relative rotation.

In another example, an actuator for an electric brake of a vehicle having a caliper assembly driven by a motor includes a gear train for transferring torque from the motor to the caliper assembly to brake the vehicle. The gear train has an input gear and a sun gear having a slip-fit connection with one another. A load sensing device senses relative rotation between the sun gear and the input gear in response to rotation of the motor during a braking operation. The load sensing device includes a torsion spring having a base rotatable with the sun gear and arms fixed to the input gear. A magnetic position sensor is aligned with the torsion spring for detecting deflection thereof indicative of the relative rotation. A controller is connected to the load sensing device and configured to adjust the torque applied to the gear train in response to receiving signals from the load sensing device indicative of the relative rotation.

In another example, a method of controlling a caliper assembly of a vehicle includes applying current to a motor for actuating the caliper assembly to initiate a braking operation. Relative rotation is sensed between a sun gear and an input gear in a gear train transferring torque from the motor to the caliper assembly. The current applied to the motor is adjusted until the sensed relative rotation reaches a predetermined amount.

Other objects and advantages and a fuller understanding of the invention will be had from the following detailed description and the accompanying drawings.

DETAILED DESCRIPTION

Figure 1:
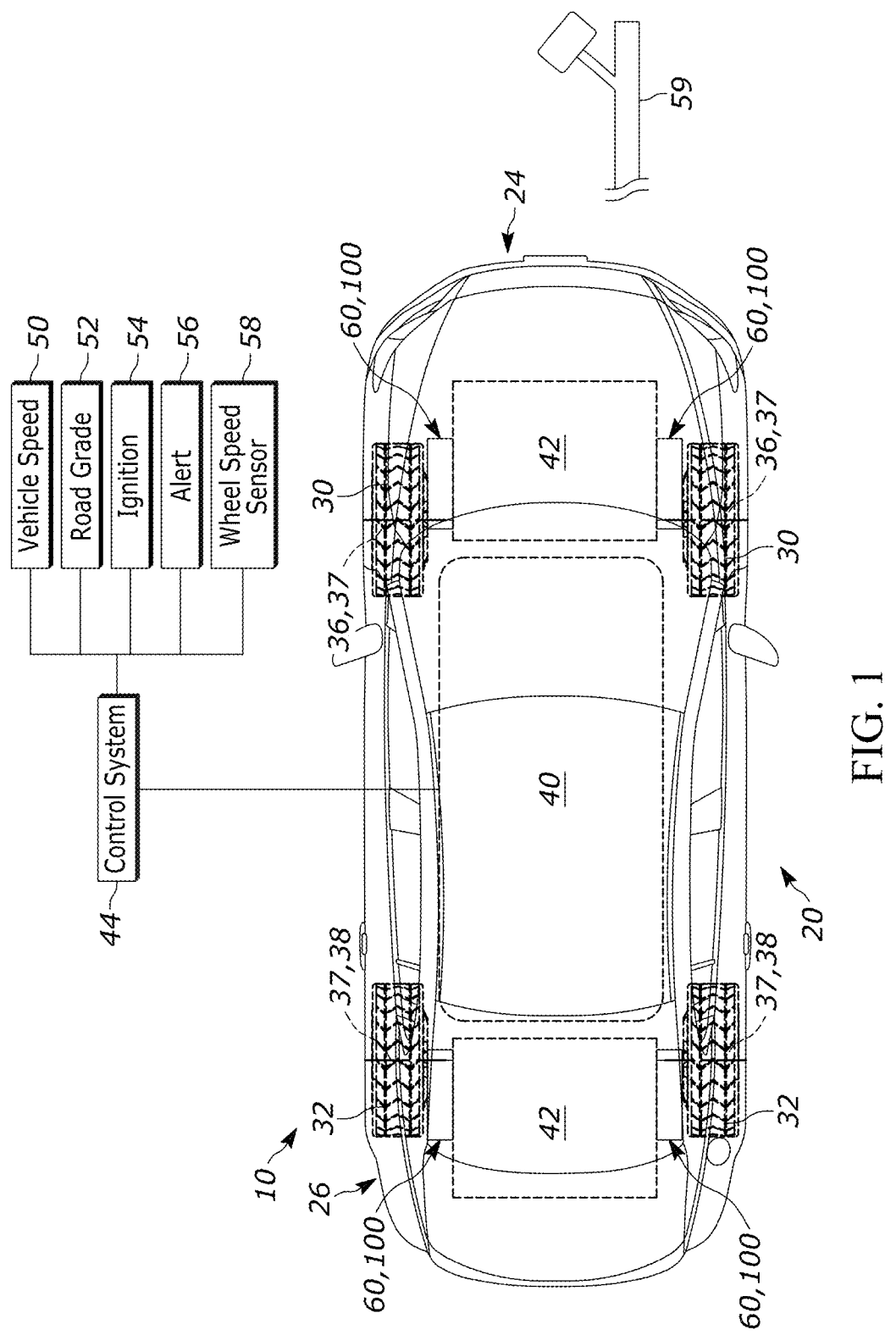
FIG. 1 is a schematic illustration of a vehicle having a braking system.
Figure 2:
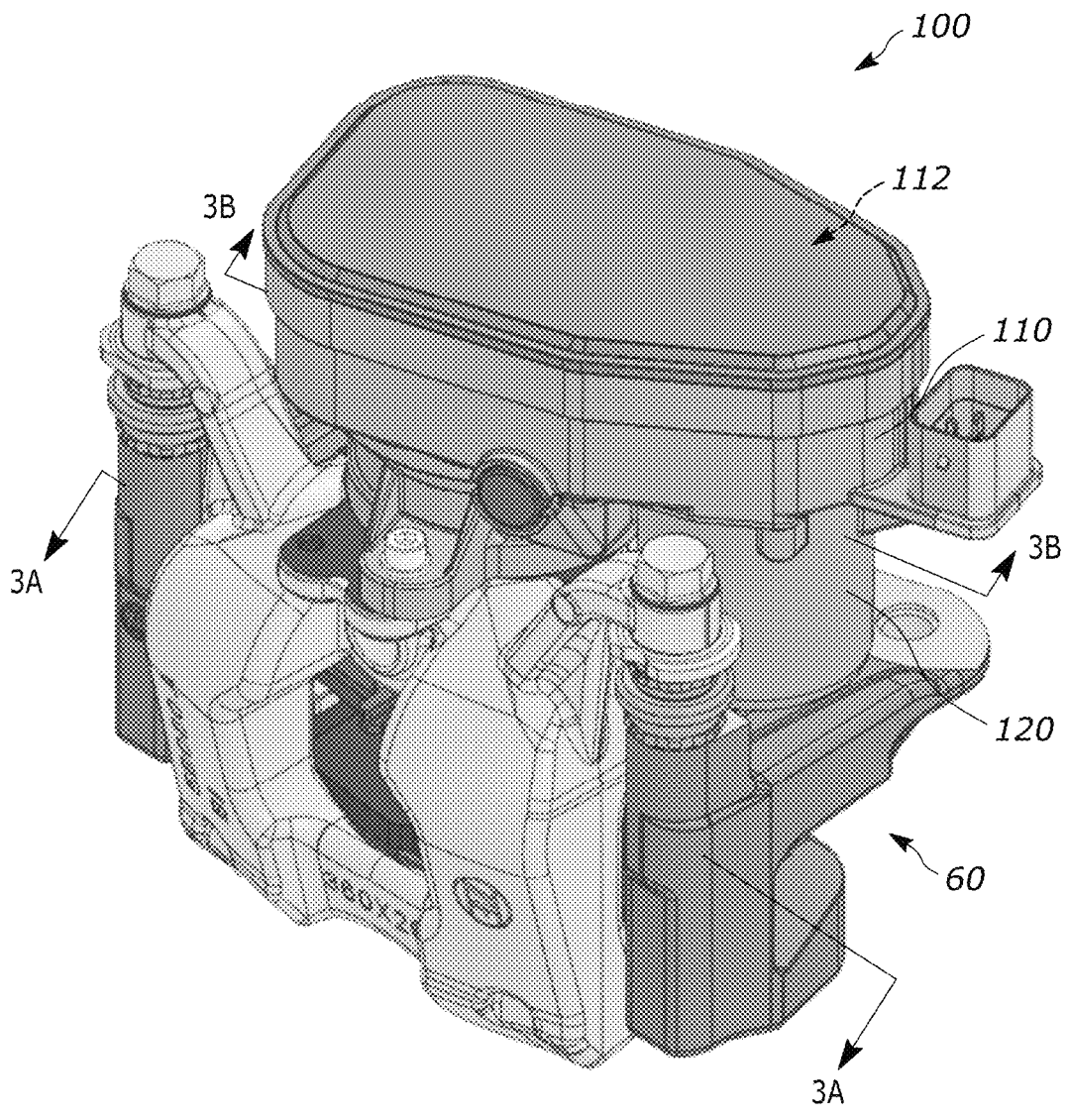
FIG. 2 is a perspective view of an example caliper and actuator for the braking system of FIG. 1.

The present invention relates to braking systems and, in particular, relates to an electric brake having a load sensing device. FIG. 1 illustrates an example electric brake/braking system 10 for a motor vehicle 20 in accordance with the present invention. The vehicle 20 can be an electric or hybrid vehicle.

The vehicle 20 extends from a first or front end 24 to a second or rear end 26. A pair of steerable wheels 30 is provided at the front end 24. Each wheel 30 includes a wheel rotor 36 driven and steered by a steering linkage (not shown). A pair of steerable or non-steerable wheels 32 is provided at the rear end 26. Each wheel 32 includes a wheel rotor 38 driven by a steering linkage (not shown). Friction brake pads 37 are associated with each wheel rotor 36, 38 and positioned on opposite sides thereof.

In the case of an electric vehicle, a battery 40 supplies power to the vehicle 20 and cooperates with front and/or rear powertrains 42 to supply torque to the wheels 30. In other words, the battery 40 forms part of the vehicle propulsion system.

Figure 3A:
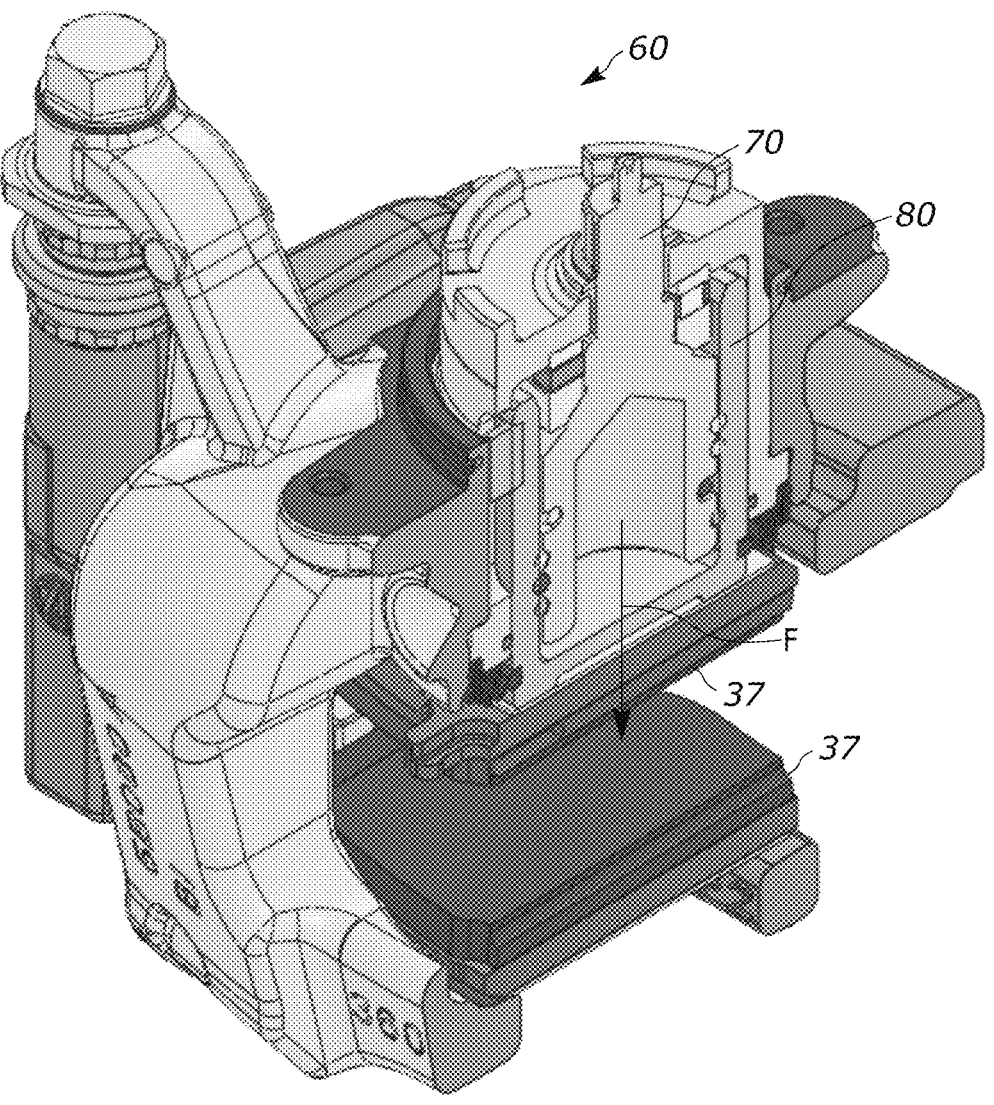
FIG. 3A is a section view of the caliper taken along line 3A-3A in FIG. 2.

A caliper or caliper assembly 60 is provided on at least one of the wheel rotors 36, 38 and controls both service braking and the parking brake associated with that wheel rotor. As shown, each wheel rotor 36, 38 on the front and rear ends 24, 26 includes a caliper assembly 60. The caliper assembly 60 is an electromechanical brake and therefore does not rely on or require hydraulic fluid to operate. As shown in FIG. 3A, the caliper assembly 60 includes a spindle 70 and a piston 80 operably coupled thereto for selectively applying braking force F to the rotor 36 or 38 via the brake pads 37 in a known manner.

The caliper assembly 60 can be configured as a ball nut assembly (recirculating or non-recirculating), a roller screw, a ball ramp assembly or any high efficiency mechanical assembly capable of converting rotary motion of the spindle to linear motion of the piston(s). Examples of ball nut and ball ramp assemblies can be found in U.S. Pat. No. 9,976, 614 and U.S. Patent Publication No. 2019/0331180, the entirety of which are incorporated herein by reference.

A control system 44 is provided to help control operation of the vehicle 20, such as operation of the propulsion system and vehicle braking, including operation of the caliper assemblies 60. To this end, the control system 44 can include one or more controllers, such as a propulsion system controller, motor controller, and/or brake controller. That said, the control system 44 is connected to and receives signals from various sensors that monitor vehicle functions and environmental conditions.

For example, a vehicle speed/acceleration sensor 50 monitors the vehicle speed and acceleration and generates signals indicative thereof. A road grade sensor 52 can detect or calculate the slope of the road on which the vehicle 20 is driving and generate signals indicative thereof. An ignition sensor 54 generates signals indicative of ignition status. A wheel speed sensor 58 is provided on/adjacent to each wheel 32 and generates signals indicative of the speed at each wheel. The control system 44 also receives signals indicative of the degree—including velocity and acceleration—a brake pedal 59 is depressed.

The control system 44 can receive and interpret these signals and perform vehicle functions, e.g., braking, in response thereto. In one example, the control system 44 can detect wheel slip between one or more wheels 30, 32 and the driving surface based on the sensors 50, 58 and perform anti-lock braking (ABS) and/or electronic stability control (ESC) using one or more caliper assemblies 60. The control system 44 can also be connected to an alert 56 for notifying the driver/operator of the vehicle 20 of vehicle conditions, vehicle status, braking operations, and/or environmental conditions.

Figure 3B:
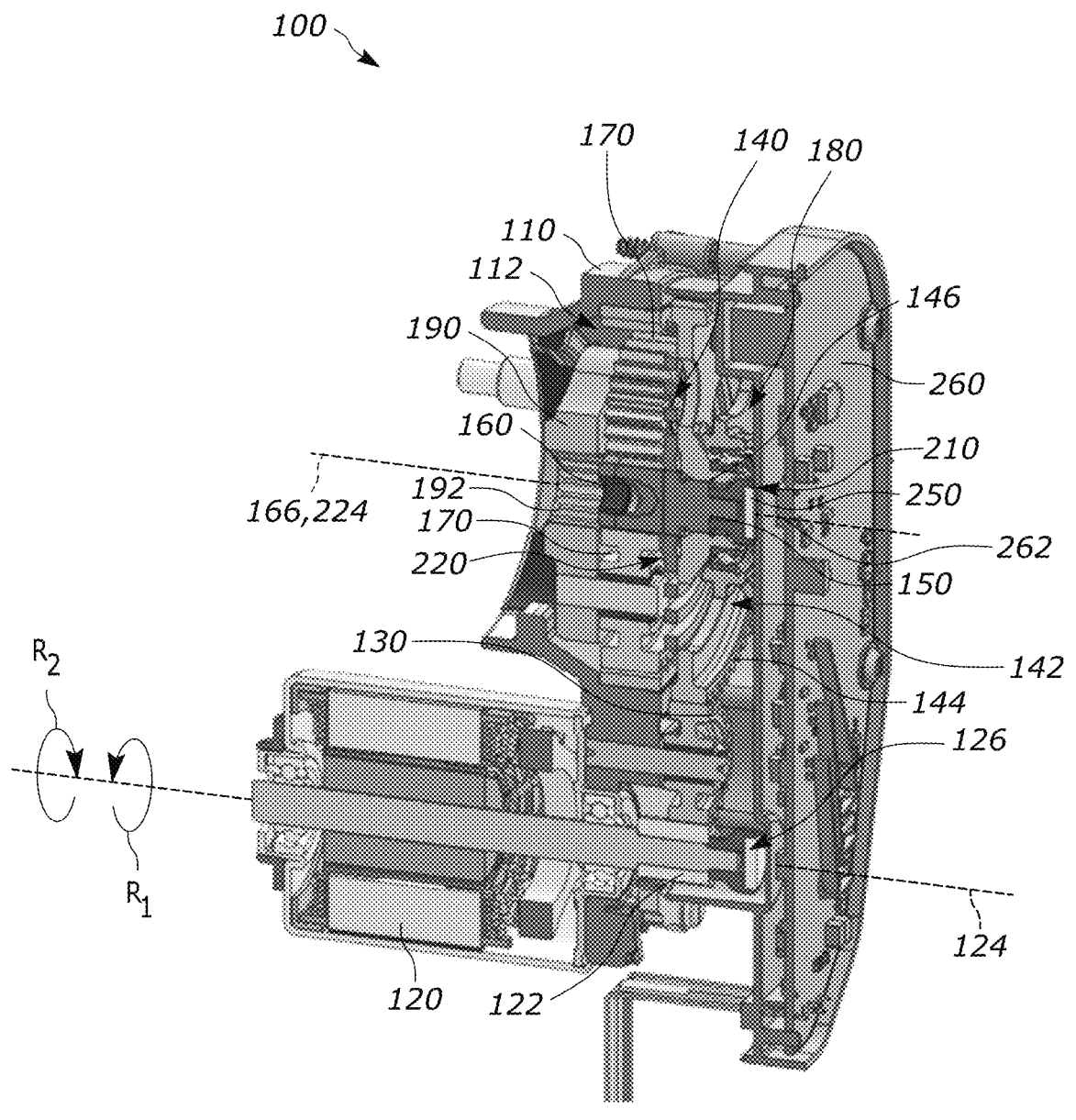
FIG. 3B is a section view of the actuator taken along line 3B-3B in FIG. 2.

Referring to FIG. 3B, the actuator 100 includes a housing 110 defining an interior space 112. A motor 120 is connected to the housing 110 and includes a pinion or output motor gear 122. The motor 120 is actuated to rotate the motor gear 122 in the manners $R_1$ or $R_2$ (counterclockwise or clockwise, respectively, as shown) about an axis 124. A sensor 126, e.g., a magnetic position sensor, tracks the rotational position of the motor gear 122 relative to the axis 124.

A gear train 140, including a planetary gear stage, is provided in the interior space 112. The gear train 140 includes an input gear 142 (see FIG. 4A) having exterior teeth 144. A hollow projection 146 extends from the input gear 142. A recess 147 is provided around the exterior of the projection 146. Openings 148 are arranged circumferentially about the input gear 142 and spaced from the projection 146. An idler gear 130 is meshed with the motor gear 122 and the input gear 142 for transferring torque therebetween.

The gear train 140 further includes a sun gear 150 having longitudinally extending teeth 152 (see FIGS. 4B and 4C), e.g., spur gear teeth. A projection 156 extends longitudinally from the sun gear 150 away from the teeth 152. A pin 158 extends from the projection 156. The sun gear 150 further includes a passage 160 (see FIG. 3B) for receiving an end of the spindle 70. The sun gear 150 is rotatable about an axis 166.

Planet gears 170 are rotatably mounted on a carrier 190 and meshed with the teeth 152 of the sun gear 150. The planet gears 170 orbit the sun gear 150 in response to rotation of the carrier 190 and/or rotation of the input gear 142 in a known manner. It will be appreciated that gear trains different than that shown can be used to transfer torque from the motor 120 to the spindle 70. This can include, for example, more or less gears than shown in the gear train 140 and/or different gears than those illustrated and described.

Returning to FIGS. 4A-4B, a cross-member 180 is provided for locating/positioning the gear train 140 within the housing 110. The cross member 180 includes a cylindrical base 182 having an opening 184 for receiving the projection 146 on the input gear 142. First and second recesses 186, 188 (see FIG. 6) are provided along the opening 184. Arms 194 extend radially outward from the base 182. Each arm 194 includes an opening 196 for receiving a fastener (not shown) to secure the cross member 180 to the housing 110.

Figure 5:
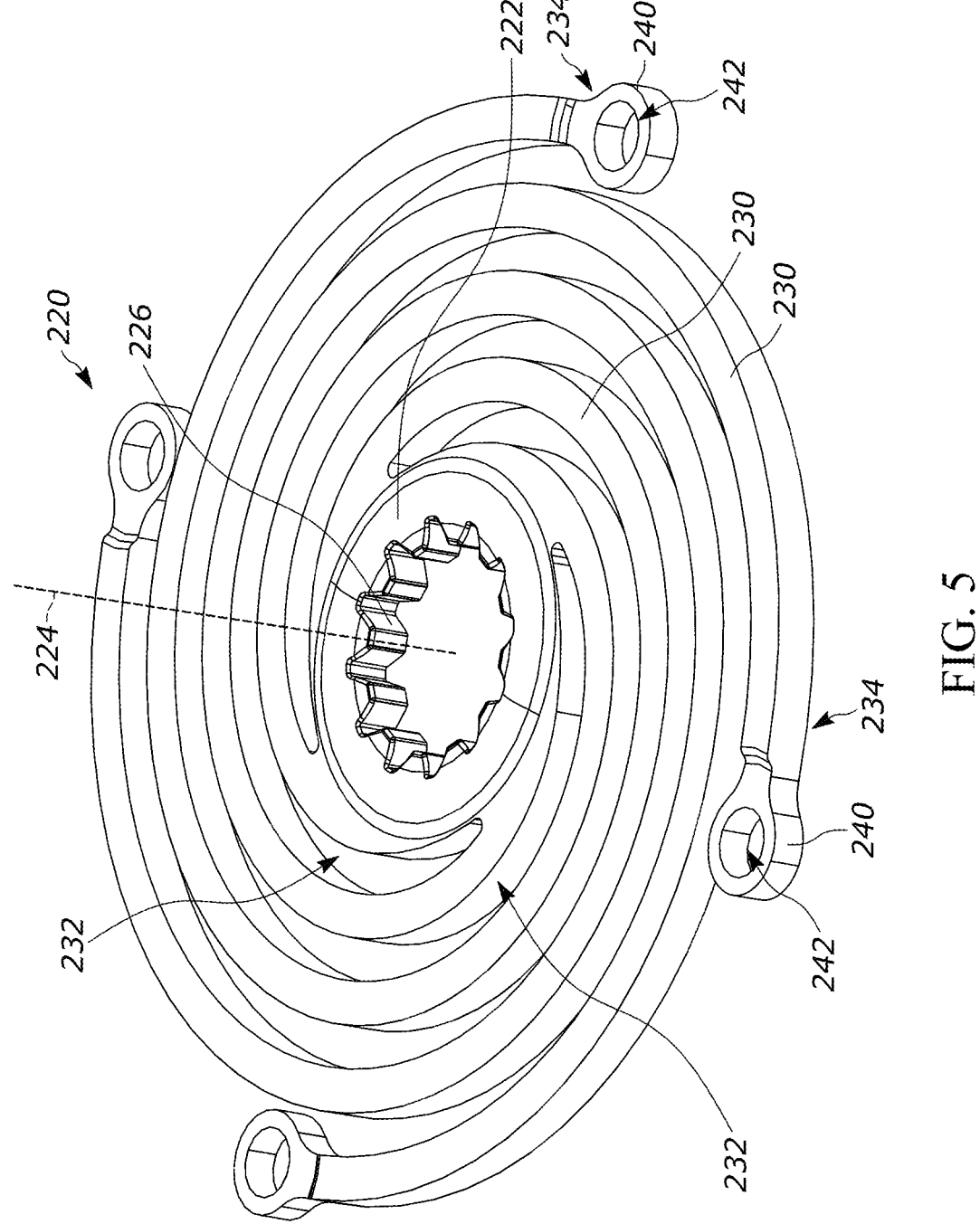
FIG. 5 is a perspective view of a load sensing device for the actuator.

A load sensing device 210 is provided for sensing loads between the sun gear 150 and the input gear 142. In one example, the load sensing device 210 senses relative rotation between the sun gear 150 and the input gear 142 about the axis 166. To this end, and referring to FIG. 5, the device 210 includes a spring 220, e.g., a torsion spring, having a cylindrical base 222 centered about a centerline 224. The base 222 includes interior teeth 226. At least one arm 230 extends outward from the base 222. As shown, multiple arms 230 extend both radially and circumferentially about the base 222. In this manner, the torsion spring 220 has a generally spiral shape or configuration such that the arms 230 are generally concentric with one another. It will be appreciated that alternatively a single arm 230 can extend from the base 222 in a spiral manner such that successive passes are substantially concentric with one another (not shown).

Each arm 230 extends from a first end 232 connected to the base 222 to a second, free end 234 spaced from the base. The second end 234 terminates at a projection 240. An opening 242 extends through the projection 240 in a direction parallel to the centerline 224. The torsion spring 220 can be formed from a steel spring material.

Figure 4A:
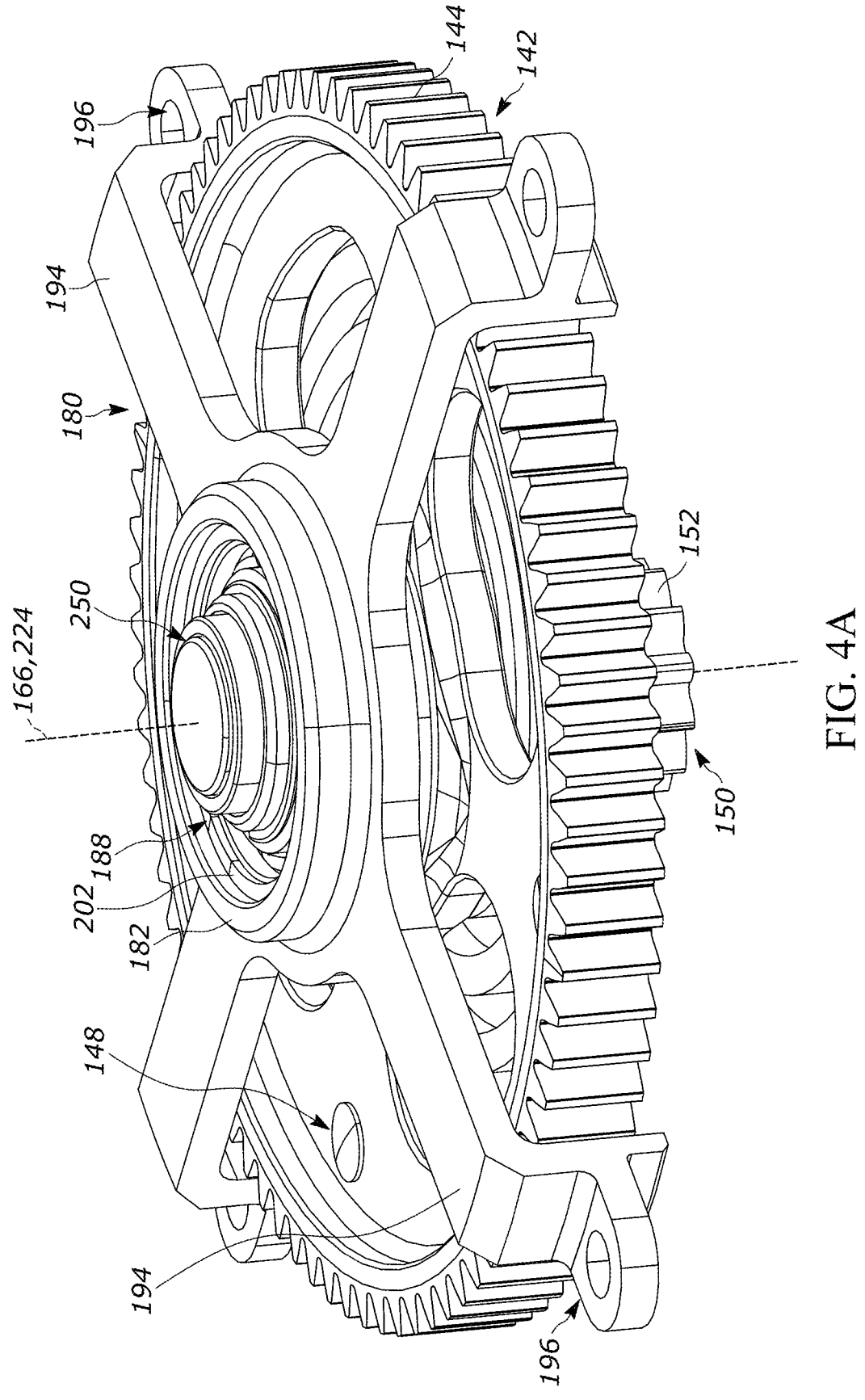
FIG. 4A is a perspective view of a portion of the actuator.
Figure 4B:
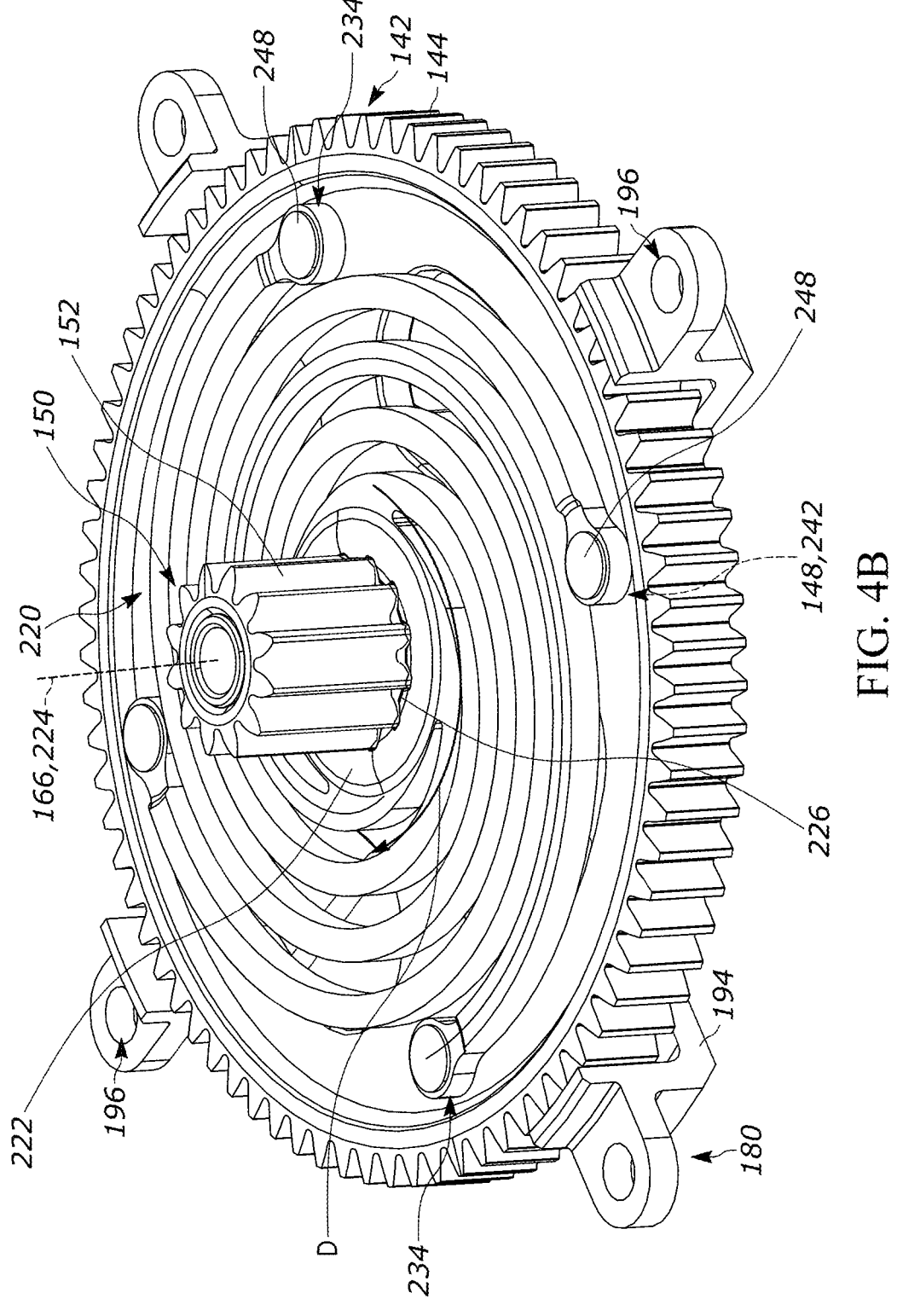
FIG. 4B is a bottom view of FIG. 4A.
Figure 4C:
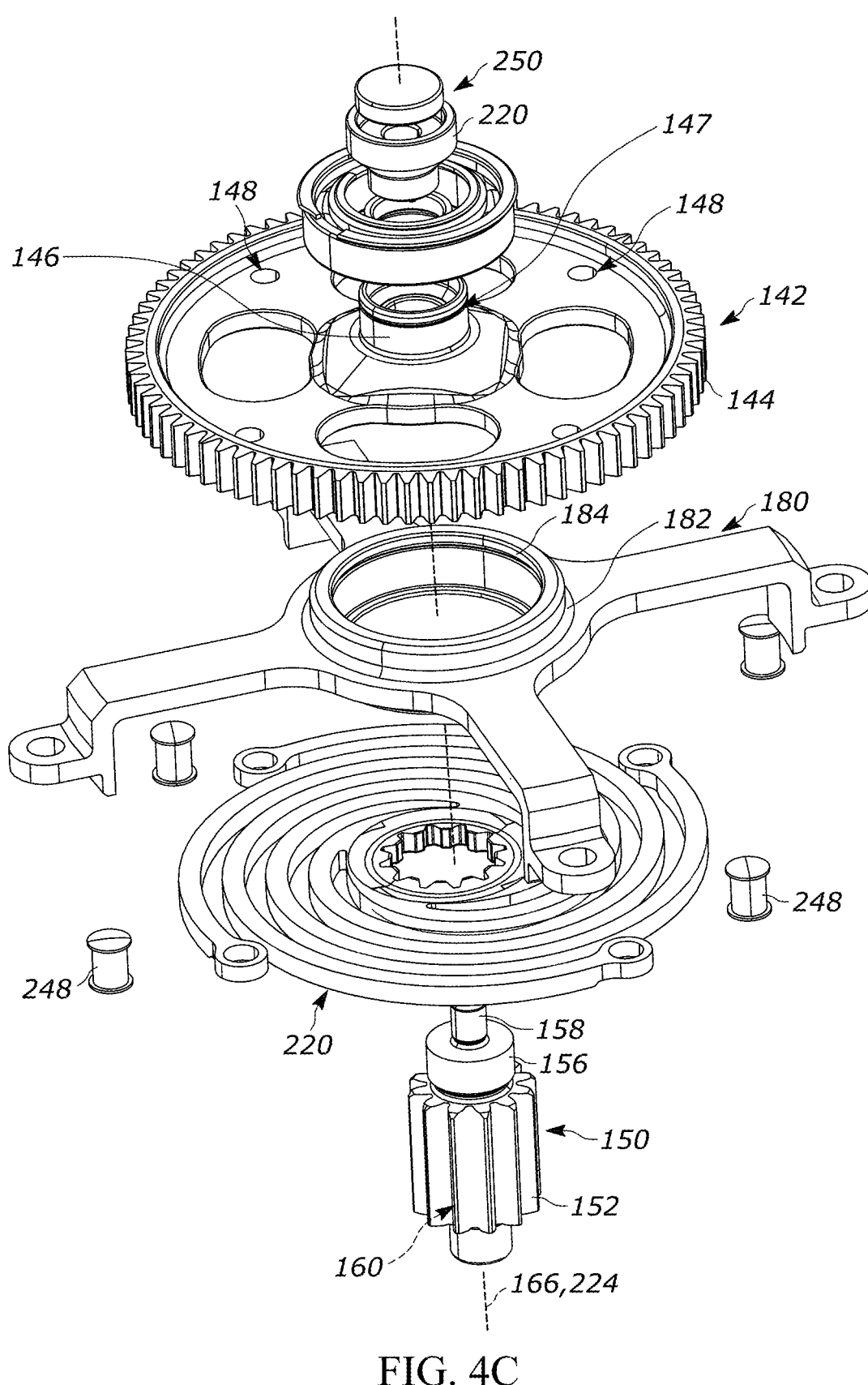
FIG. 4C is an exploded view of the actuator portion of the FIG. 4A.

The torsion spring 220 is secured to the sun gear 150 by mating the teeth 152, 226 as shown in FIG. 4C. This aligns the axis 166 with the centerline 224. Pins or rivets 248 extend through the openings 148 in the input gear 142 and the openings 242 in the torsion spring 220 to fix the second ends 234 of the arms 230 to the input gear.

As shown in FIG. 4A, a position sensor 250, such as a magnetic position sensor, is aligned with the torsion spring 220. In one example, the position sensor 250 is similar to the position sensor 126 utilized for monitoring/controlling rotation of the motor 120. The position sensor 250 is mounted on the sun gear 150 and rotates together with the sun gear. The position sensor 250 is aligned along the coextensive axes 166, 224 with an electronic component 262 on a printed circuit board (PCB) 260 connected to the housing 110 (see FIG. 3B).

The position sensor 250 is configured to measure rotation of the sun gear 150. In particular, as the clamp force increases during a service brake event, torque on the sun gear 150 increases, which causes the torsion spring 220 to slightly deflect. This also causes the position sensor 250 to rotate slightly, thereby changing its magnetic field. The magnetic field change is detected by the component 262 on the PCB 260, which converts the magnetic field change into a degree of rotation. By comparing the amount of rotation of the motor position sensor 126 to the calculated rotational position change of the position sensor 250, the amount of torque at the sun gear 150 can be estimated and therefore the clamp force can be estimated.

In particular, the gear ratio between the motor gear 122 (motor position sensor 250) and the sun gear 150 is known. When there is no torque in the gear train 140, this gear ratio holds at a known, fixed value even as the motor 120 rotates. If clamp force is generated and the torque increases in the gear train 140, the torsion spring 220 deflects, which increases the gear ratio between the sun gear 150 and the motor gear 122. That said, the degree to which the gear ratio increases (before and after torsion spring 220 deflection) indicates the degree of clamp force. Accordingly, the larger the gear ratio difference, the larger the clamp force.

Figure 6:
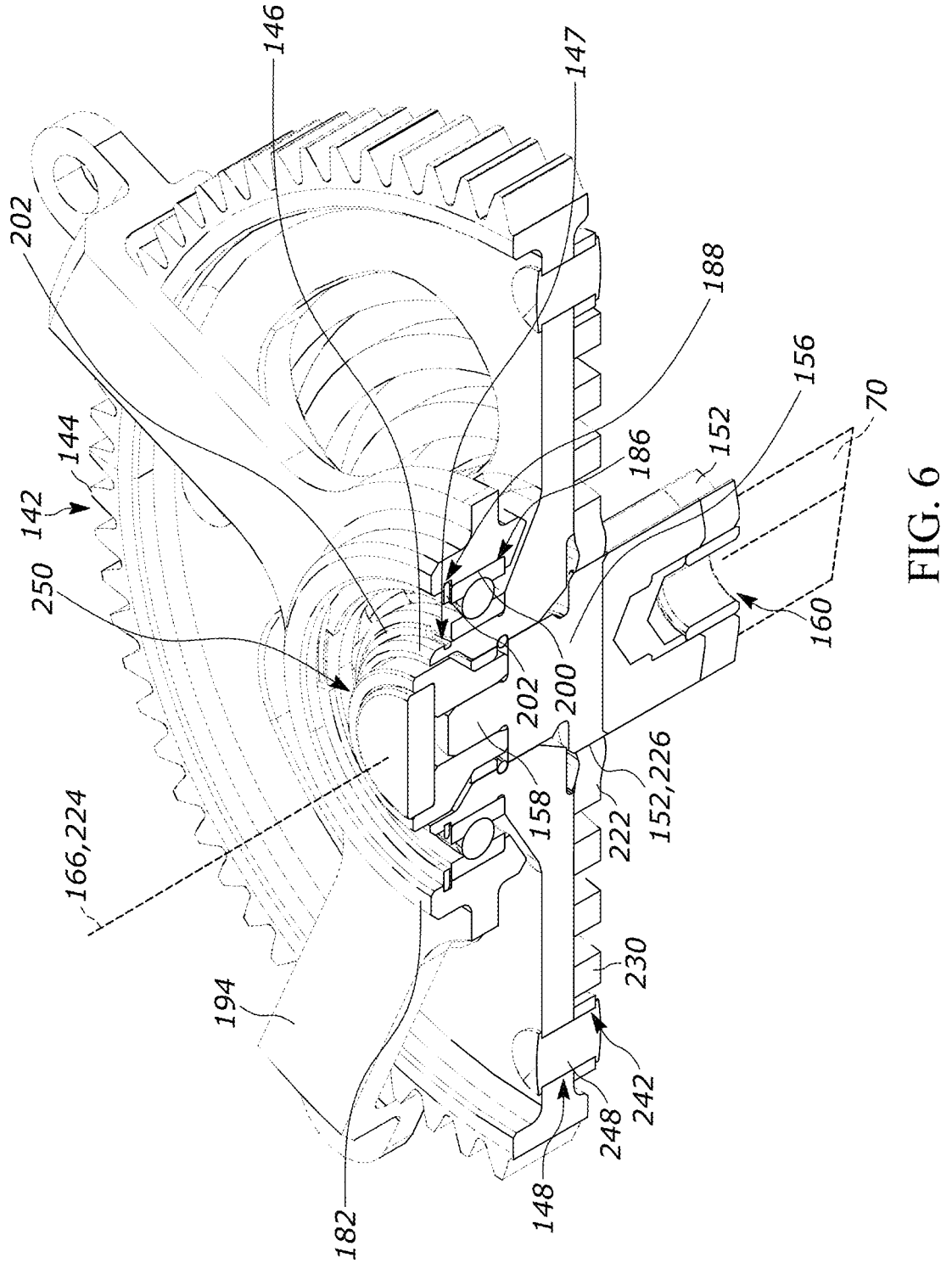
FIG. 6 is a section view of the load sensing device of the actuator.

As shown in FIG. 6, when the actuator 100 is assembled, a bearing 200 is provided in the first recess 186 and receives the projection 146 of the input gear 142 for locating the input gear within the housing 110. Retaining rings 202 are provided in the recesses 147, 188 to secure the bearing 200 within the first recess 186 and thereby locate the input gear 142. More specifically, the bearing 200 is pinned between the retaining rings 202 and the projection 146. The projection 156 of the sun gear 150 is received in the projection 146 of the input gear 142. The position sensor 250 extends over the projection 156 on the sun gear 150 and radially between the projection 158 and the projection 146 of the input gear 142.

The sun gear 150 and input gear 142 are formed from separate components having a slip-fit with one another. More specifically, the projection 156 on the sun gear 150 has a slip-fit with the hollow projection 146 of the input gear 142. With this in mind, the sun gear 150 and input gear 142 are capable of rotating relative to one another. A bushing or bearing (not shown), if desirable, may be provided at the interface between the input gear 142 and sun gear 150 to facilitate relative rotation therebetween.

The planetary gears 170 mesh with the sun gear 150. The planetary gears 170 are mounted on axles which are permanently fixed to the carrier 190. The spindle 70 (shown in phantom) is connected to the carrier 190 via a splined interface with the actuator 100. The spindle 70 is also coupled to the piston 80 together forming a ball nut assembly (BNA), such that rotation of the sun gear 150 causes rotation of the carrier 190 and the spindle 70 thereby resulting in an adjustment of the longitudinal position of the piston for applying/releasing both the service and parking brakes on the rotor 36 or 38 in a known manner. To this end, the carrier 190 includes splines 192 (see FIG. 3B) for mating with the spindle 70 to transfer torque therebetween. With this in mind, the gear train 140 is configured such that rotation of the motor gear 122 in the manner $R_1$ (see also FIG. 3B) results in advancing the piston 80 towards the rotor 36 or 38 to brake the vehicle 20. On the other hand, rotation of the motor gear 122 in the manner $R_2$ results in the piston 80 retreating away the rotor 36 or 38 to reduce or release braking of the vehicle 20.

During operation of the vehicle 20, a service brake apply demand is initiated by the system and/or vehicle operator. In this example, service braking is provided for a single, rear end 26 wheel rotor 38 (see FIG. 1). The brake demand is based on signals received by the control system 44 indicative of the brake pedal 59 depression. With this in mind, the control system 44 activates the motor 120 (see FIGS. 3A-3B) to rotate in a brake apply direction $R_1$ to supply torque to the spindle 70 along the aforementioned flow path. This, in turn, causes the piston 80 to apply a braking force F to the brake pad 37, thereby braking the rotor 38. Rotation of the motor 120 continues until the deflection detected at the position sensor 250 with respect to the motor position sensor 126 corresponds with a braking force F applied to the rotor 38.

It will be appreciated that rotation of the motor 120 can be precisely controlled using pulse width modulation (PWM). For example, the degree and/or rate of braking force F on the pad 37 during braking can be finely tuned as well as the degree and/or rate of braking force reduction during an ABS event. The control system 44 can rely on signals from any of the sensors indicating, for example, road surface conditions, in controlling PWM.

In any case, and returning to FIG. 4B, as the motor 120 rotates, torque is transferred through the motor gear 122, the idler gear 130, and to the input gear 142. As noted, the arms 230 of the torsion spring 220 are secured to the input gear 142 at the pins 248, and the base 222 is meshed with the sun gear 150. The input gear 142 and sun gear 150, however, have a slip-fit connection. Consequently, the torsion spring 220 provides the sole mechanism for transferring torque between the input gear 142 and the sun gear 150.

To this end, as the input gear 142 rotates, the second ends 234 of the arms 230, which are fixed to the input gear, orbit the axis 224. During a service brake event, the torque increase on the sun gear 150 causes the torsions spring 220 to deflect and thus relative rotation occurs between the input gear 142 and the sun gear 150. This deflection is generally indicated at D in FIG. 4B.

Ultimately, the deflection/orbital movement is sufficient to cause the base 222 to rotate about the axis 224, thereby rotating the sun gear 150 about the axis 166. This, in turn, enables the sun gear 150 to deliver torque to the rest of the planetary gear train 140 and spindle 70 to advance the piston 80. Torque is transferred through the connection 152, 226 while the projection 156 rotates freely within the hollow projection 146.

It will be appreciated that deflection D of the torsion spring 220 is sensed/monitored by the position sensor 250. This deflection D is directly related to, e.g., directly proportional to, the braking force F applied by the piston 80 to the rotor 38. In one example, the control system 44 is pre-programmed with a lookup table or the like that correlates deflection D of the torsion spring 220 with braking force F. This relationship can be determined by first establishing the correlation between sun gear 150 torque and the braking force F at the rotor 38. The relationship between sun gear 150 torque and deflection D of the torsion spring 220 is also established. The latter can be based on, for example, the material properties, e.g., stiffness, of the torsion spring 220, the connection between the base 222 and the sun gear 150, the connection between the second ends 234 and the input gear 142, and/or the spacing, number, and configuration of the arm(s) 230.

That said, the control system 44 can correlate the sensed deflection D to the applied braking force F in real-time. At the same time, the control system 44 relies on the magnetic position sensor 126 to track rotation of the motor 120. The control system 44 is also programmed with the expected or theoretical correlation between the rotational position of the motor 120 and the rotational position of the sun gear 150, the latter of which can be determined by the sensed deflection D of the torsion spring 220.

Certain factors, however, may cause the rotational position of the motor 120 to deviate from the expected braking force F at the rotor 38. This can include, for example, tolerances in the gear train 140, idler gear 130, etc. and/or deviations in the motor 120 performance/tolerance from the expected construction. With this in mind, each caliper assembly 60 can be evaluated so that it can be "calibrated" in the control system 44, which can then adjust, e.g., increase or decrease, the current delivered to the motor 120 until the sensed deflection D reaches an amount equivalent to a desired braking force F at the rotor 38 according to the calibration. Since each wheel 36, 38 has an associated caliper assembly 60 and actuator 100, the control system 44 can precisely and independently control the braking force F at each rotor 38 by monitoring the respective motor 120 rotational position and deflection D at the respective load sending device 220. This precise control enables the control system 44 to account for variations in and between the caliper assemblies 60, actuators 100, brake pads, etc.

When braking is reduced or terminated, the control system 44 rotates the motor 120 in the direction $R_2$ (FIG. 3A) to retract the piston from the rotor. The slip-fit connection between the sun gear 150 and input gear 142 allows the retracting piston to back drive the motor 120 through the spindle 70, gear train 140, idler gear 130, and motor gear 122. More specifically, the back-driven sun gear 150 transfers torque to the base 222 which, in turn, transfers torque through the arms 230 to the pins 248 and ultimately to the input gear 142. The input gear 142 then transfers the torque through the idler gear 130 to the motor gear 122.

The load sensing device of the present invention is advantageous in that it enables the control system to correct the motor current applied to any/all of the caliper assemblies to help ensure the braking force is both correct in terms of desired degree and distribution amongst the wheels. The load sensing device also allows the control system to adapt over time to changes in component interrelation, wear, motor deterioration or reduction in performance, etc.

The load sensing device is capable of providing these advantages specifically because the input gear and sun gear and formed as separate components. In other words, mechanical separation is provided between the two components. Consequently, torque between the two gears can not only exist but also be detected by measuring the deflection of the torsion spring connecting the two gears and transferring torque therebetween.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. An actuator for an electric brake of a vehicle having a caliper assembly driven by a motor, comprising:
   a gear train for transferring torque from the motor to the caliper assembly to brake the vehicle, the gear train including an input gear and a sun gear connected to one another;
   a load sensing device for sensing relative rotation between the sun gear and the input gear in response to rotation of the motor during a braking operation; and
   a controller connected to the load sensing device and configured to adjust the torque applied to the gear train in response to receiving signals from the load sensing device indicative of the relative rotation.

2. The actuator of claim 1, wherein the load sensing device comprises:
   a torsion spring connected to the sun gear and the input gear; and
   a position sensor aligned with the torsion spring for detecting deflection thereof indicative of the relative rotation.

3. The actuator of claim 2, wherein the torsion spring includes a base rotatable with the sun gear and at least one arm extending from the base and movable with the input gear.

4. The actuator of claim 3, wherein the base and the sun gear have a splined connection with one another.

5. The actuator of claim 3, wherein the at least one arm comprises a plurality of arms extending radially and circumferentially about the base.

6. The actuator of claim 3, wherein the at least one arm comprises a plurality of arms extending spiraling outward from the base.

7. The actuator of claim 2, wherein each arm extends from a first end connected to the base to a free, second end connected to the input gear.

8. The actuator of claim 7, wherein a fastener extends through each second end and into the input gear to secure each second end to the input gear.

9. The actuator of claim 2, wherein the position sensor is a magnetic position sensor.

10. The actuator of claim 1, wherein the sun gear and the input gear have a slip-fit connection with one another.

11. An actuator for an electric brake of a vehicle having a caliper assembly driven by a motor, comprising:
   a gear train for transferring torque from the motor to the caliper assembly to brake the vehicle, the gear train including an input gear and a sun gear having a slip-fit connection with one another;
   a load sensing device for sensing relative rotation between the sun gear and the input gear in response to rotation of the motor during a braking operation, comprising:
      a torsion spring having a base rotatable with the sun gear and arms fixed to the input gear; and
      a magnetic position sensor aligned with the torsion spring for detecting deflection thereof indicative of the relative rotation; and
   a controller connected to the load sensing device and configured to adjust the torque applied to the gear train in response to receiving signals from the load sensing device indicative of the relative rotation.

12. The actuator of claim 11, wherein the arms extend radially and circumferentially about the base.

13. The actuator of claim 11, wherein the arms spiral outward from the base.

14. The actuator of claim 11, wherein each arm extends from a first end connected to the base to a free, second end connected to the input gear.

15. The actuator of claim 14, wherein a fastener extends through each second end and into the input gear to secure each second end to the input gear.

16. The actuator of claim 11, wherein the base and the sun gear have a splined connection with one another.

17. A method of controlling a caliper assembly of a vehicle, comprising the steps of:
   applying current to a motor for actuating the caliper assembly to initiate a braking operation;
   monitoring relative rotation between a sun gear and an input gear in a gear train as torque is generated from the motor to a spindle, monitoring the relative rotation including:
      determining rotation of a first magnetic position sensor rotatable with the sun gear;
      determining rotation of a second magnetic position sensor rotatable with the motor; and
      comparing the determined rotations to one another to monitor relative rotation between the sun gear and the input gear; and
   adjusting the current applied to the motor until the monitored relative rotation reaches a predetermined amount.

* * * * *